(12) United States Patent
Sun

(10) Patent No.: US 9,423,586 B2
(45) Date of Patent: Aug. 23, 2016

(54) FIBER OPTIC CONNECTORS, CABLE ASSEMBLIES AND METHOD FOR MAKING THE SAME

(71) Applicant: CORNING CABLE SYSTEMS (SHANGHAI) CO. LTD, Hickory, NC (US)

(72) Inventor: JiWei Sun, Shanghai (CN)

(73) Assignee: Corning Cable Systems (Shanghai) CO., LTD., Shanghai (CN)

(*) Notice: Subject to any disclaimer, the term of this patent is extended or adjusted under 35 U.S.C. 154(b) by 0 days.

(21) Appl. No.: 14/255,311

(22) Filed: Apr. 17, 2014

(65) Prior Publication Data
US 2014/0226936 A1 Aug. 14, 2014

Related U.S. Application Data

(63) Continuation of application No. PCT/CN2011/001775, filed on Oct. 25, 2011.

(51) Int. Cl.
  *G02B 6/36* (2006.01)
  *G02B 6/46* (2006.01)
  *G02B 6/38* (2006.01)

(52) U.S. Cl.
  CPC ............. *G02B 6/46* (2013.01); *G02B 6/3846* (2013.01); *G02B 6/3887* (2013.01); *G02B 6/3801* (2013.01); *Y10T 29/49826* (2015.01)

(58) Field of Classification Search
  CPC .......................................................... G02B 6/46
  USPC ................................................................ 385/81
  See application file for complete search history.

(56) References Cited

U.S. PATENT DOCUMENTS

| 4,838,641 | A | 6/1989 | Morimoto et al. ......... 350/96.21 |
| 7,011,454 | B2 | 3/2006 | Caveney et al. ................ 385/87 |
| 7,104,702 | B2 | 9/2006 | Barnes et al. |
| 7,178,990 | B2 | 2/2007 | Caveney et al. |
| 7,178,992 | B2 | 2/2007 | Vafiades et al. |
| 7,204,644 | B2 | 4/2007 | Barnes et al. |
| 7,347,627 | B2 | 3/2008 | Saito et al. |
| 7,452,138 | B2 | 11/2008 | Saito et al. |

(Continued)

FOREIGN PATENT DOCUMENTS

| CN | 1607411 A | 4/2005 | .............. G02B 6/36 |
| CN | 1938623 A | 3/2007 | .............. G02B 6/38 |

(Continued)

OTHER PUBLICATIONS

European Search Report, Application No. 11874551.2, May 22, 2015, 7 pages.

(Continued)

*Primary Examiner* — Sung Pak

(57) ABSTRACT

A fiber optic connector includes a mechanical splice assembly and a connector body. The connector body has a first portion joined to a second portion. The first portion of the connector body includes first and second chambers. An opening on a front end of the connector body passes through the first chamber into the second chamber so that the mechanical splice assembly can be inserted into the first and second chambers. The second portion of the connector body includes cable retention arms that extend out from the rear end of the first portion and an opening that passes into the second chamber.

22 Claims, 15 Drawing Sheets

(56) References Cited

U.S. PATENT DOCUMENTS

| | | |
|---|---|---|
| 8,459,880 B2 | 6/2013 | Castonguay et al. |
| 8,573,859 B2 | 11/2013 | Larson et al. |
| 8,876,405 B2 | 11/2014 | Larson et al. |
| 8,944,703 B2 | 2/2015 | Song et al. |
| 2005/0213890 A1* | 9/2005 | Barnes et al. ............... 385/55 |
| 2005/0213892 A1* | 9/2005 | Barnes et al. ............... 385/62 |
| 2006/0002662 A1 | 1/2006 | Manning et al. |
| 2007/0127872 A1 | 6/2007 | Caveney et al. |
| 2007/0133926 A1 | 6/2007 | Semmler et al. ............ 385/72 |
| 2007/0147741 A1 | 6/2007 | Meek et al. |
| 2007/0217745 A1 | 9/2007 | Semmler et al. |
| 2008/0019646 A1 | 1/2008 | deJong |
| 2009/0087151 A1 | 4/2009 | Benjamin et al. |
| 2009/0092360 A1 | 4/2009 | Lin et al. |
| 2010/0303416 A1* | 12/2010 | Danley et al. ............... 385/55 |
| 2011/0044588 A1 | 2/2011 | Larson et al. |
| 2012/0121222 A1 | 5/2012 | Castonguay et al. |
| 2013/0071070 A1 | 3/2013 | Song et al. |
| 2014/0212096 A1* | 7/2014 | Wei et al. .................... 385/81 |
| 2015/0117822 A1* | 4/2015 | Hu et al. ...................... 385/86 |

FOREIGN PATENT DOCUMENTS

| | | | |
|---|---|---|---|
| CN | 100465678 C | 3/2009 | ............ G02B 6/36 |
| CN | 101458367 A | 6/2009 | ............ G02B 6/38 |
| CN | 101833145 A | 9/2010 | |
| CN | 201681178 U | 12/2010 | |
| EP | 2551707 A1 | 1/2013 | |
| JP | 2003131075 A | 5/2003 | |
| JP | 2008241729 A | 10/2008 | |
| WO | WO2009/148797 A1 | 12/2009 | ............ G02B 6/36 |
| WO | 2011014148 A1 | 2/2011 | |
| WO | WO2011/014148 A1 | 2/2011 | ............ G02B 6/38 |
| WO | 2011116521 A1 | 9/2011 | |
| WO | 2013003295 A2 | 1/2013 | |

OTHER PUBLICATIONS

European Search Report, Application No. 11868580.9, Mar. 12, 2015, 7 pages.

BroField Technology Inc., Quick Assembly Connector (No Tool)—250um/900um User's Manual, Rev. 2011B, downloaded from internet on Mar. 1, 2016.

* cited by examiner

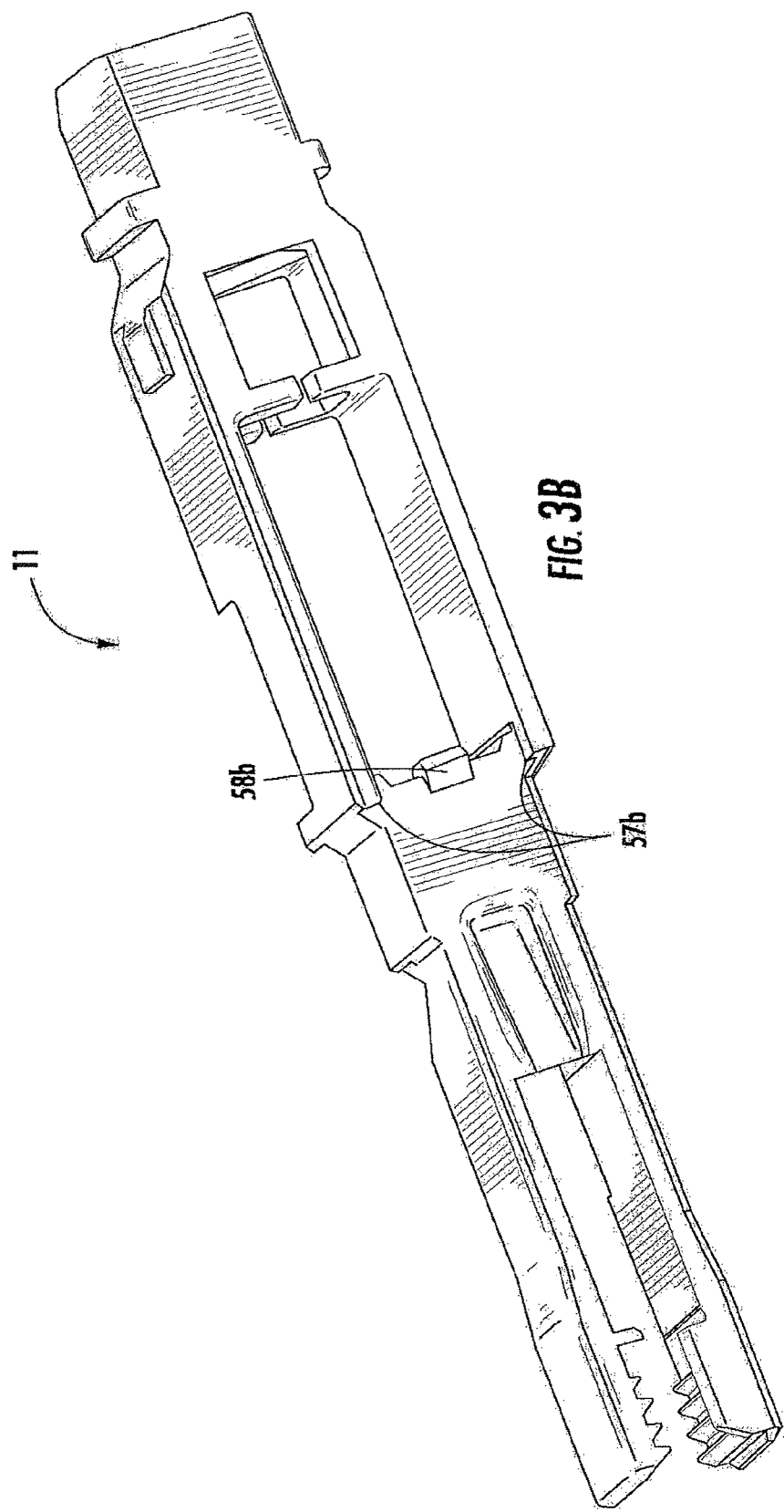

FIBER OPTIC CONNECTORS, CABLE ASSEMBLIES AND METHOD FOR MAKING THE SAME

RELATED APPLICATIONS

This application is a continuation of International Patent Application Serial No. PCT/CN11/001775, filed on Oct. 25, 2011, the content of which is relied upon and incorporated herein by reference in its entirety.

FIELD

The present disclosure relates generally to fiber optic connectors, cables assemblies, and methods for making the same. Specifically, the disclosure is directed to fiber optic connectors, cable assemblies, and methods that attach fiber optic cables to connectors.

BACKGROUND

Fiber optic communication networks are being widely used to transmit signals for voice, video, data and the like. As known to a person in the field, fiber optic cables are major carriers for signals in the fiber optic communication networks. Fiber optic cables require joining because they are manufactured in pre-determined lengths. Having many joining points, the fiber optic communication networks require cable branching and routing. A fiber optic connector is often used to join the ends of two fiber optic cables to facilitate changes in configurations of fiber optic cable routing. In addition, the optical fibers in a cable must be terminated when it reaches active transaction equipment to which the cable is coupled. To terminate a fiber optic cable, a fiber optic connector is also used as an interface between a fiber optic cable and active transaction equipment.

With fast development and increasing applications of fiber optic communication networks, more and more fiber optic connectors are required to route fiber optic cables to end users when installing fiber optic communication networks. While the existing mechanical splice connectors can meet the needs in field installation, there is a need to provide an improved mechanical splice connector that has a simpler structure with lower manufacturing cost and reduced complexity in assembling and installation.

There is another need to provide an improved structure for mechanical splice connectors, in which the core mechanical splice units are isolated from outside loadings in installation process.

There is still another need to provide an improved mechanical splice connector that has improved durability and robust and is easy to install or assemble.

SUMMARY

To overcome the shortcomings in the existing mechanical splice connectors, the present disclosure provides improved fiber optic connectors with lower manufacturing costs and better performance in field installation.

In a first aspect, the present disclosure provides a fiber optic connector that includes a mechanical splice assembly and a connector body. The connector body has a first portion and a second portion, wherein the first portion of the connector body has a front end and a rear end and the second portion of the connector body has a front end and a rear end. The rear end of the first portion is joined with the front end of the second portion. The first portion of the connector body includes a first chamber and a second chamber along an elongate direction of the first portion. The first portion of the connector body also includes an opening on its front end that passes through the first chamber into the second chamber along the elongate direction of the first portion. The mechanical splice assembly can be inserted through the first chamber into the second chamber using the opening on the first portion. The second portion of the connector body includes cable retention arms that extend out from the rear end of the first portion. The second portion also includes an opening on its front end that passes into the second chamber.

The present disclosure also provides a method for making a cable assembly that involves providing a fiber optic cable having an optical fiber. The method also involves providing a fiber optic connector having a mechanical splice assembly and a connector body. The mechanical splice assembly includes a mechanical splice assembly body, a ferrule retained in a first portion of the mechanical splice assembly body, and first and second splice parts retained in a second portion of the mechanical splice assembly body. The connector body has a first portion joined to a second portion, and the first portion includes a first chamber and second chamber. The mechanical splice assembly is inserted through an opening on the first portion of the connector body and into the first and second chambers. The fiber optic cable is positioned in the second portion of the connector body, and the optical fiber of the fiber optic cable is inserted into the mechanical splice assembly. The method also involves securing the optical fiber of the fiber optic cable in the mechanical splice assembly.

By providing the components in the above mentioned fiber optic connectors and the steps in the above mentioned methods for making a cable assembly using the fiber optic connectors, the present invention overcomes the above mentioned shortcomings in the existing mechanical splice connectors.

BRIEF DESCRIPTION OF THE FIGURES

The present invention will be described with reference to the accompanying drawings, wherein:

FIGS. 3A-3B are enlarged top and bottom perspective views of a connector body 11 shown in FIG. 2;

DETAILED DESCRIPTION

Reference is now made to the embodiments, examples of which are illustrated in the accompanying drawings. In the detailed description of the embodiments, directional and consequential terminology, such as "first," "second," "top," "bottom," "front," "rear," "side," "left," "right," "forward," "trailing," etc., is used with reference to the orientation of the FIG.(s) being described. Because components of embodiments of present invention can be positioned in a number of different orientations, the directional and consequential terminology is used for purposes of illustration and is in no way limiting. Whenever possible, the same or similar reference numbers and symbols are used throughout the drawings to refer to the same or similar parts.

Figure 1:
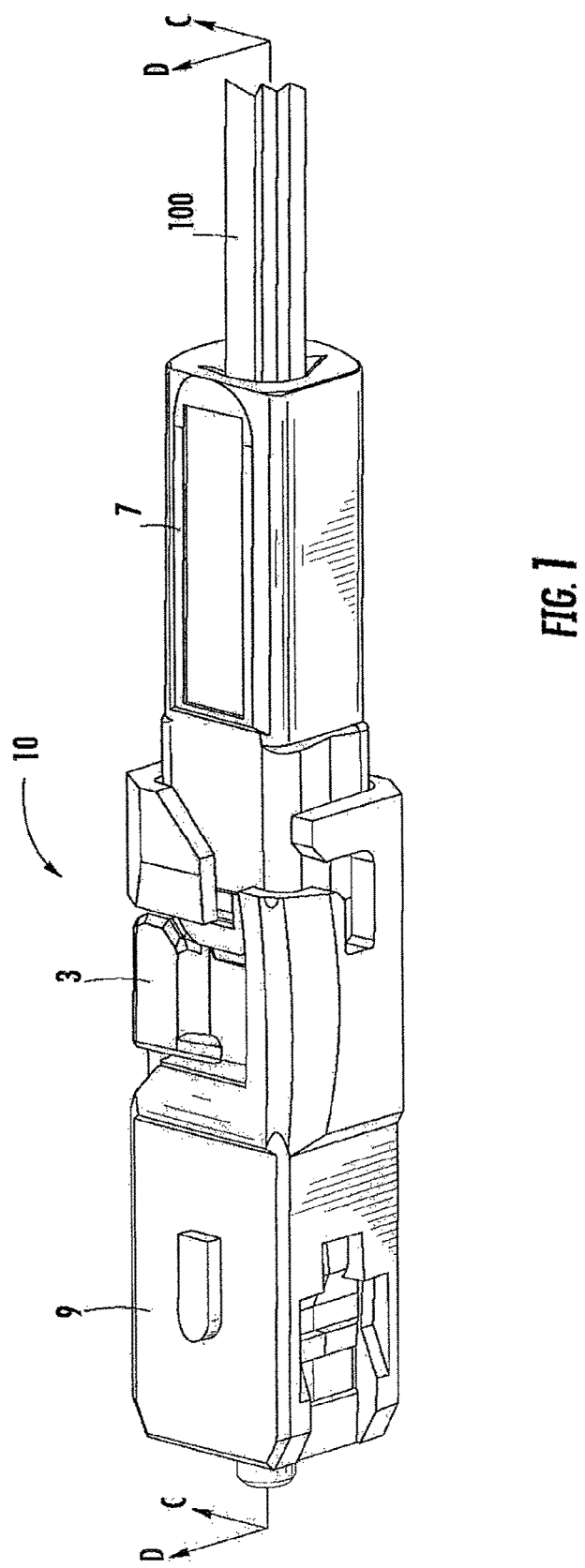
FIG. 1 is a perspective view of an exemplary cable assembly 10 for explaining the concepts and principles of the present disclosure.
Figure 2:
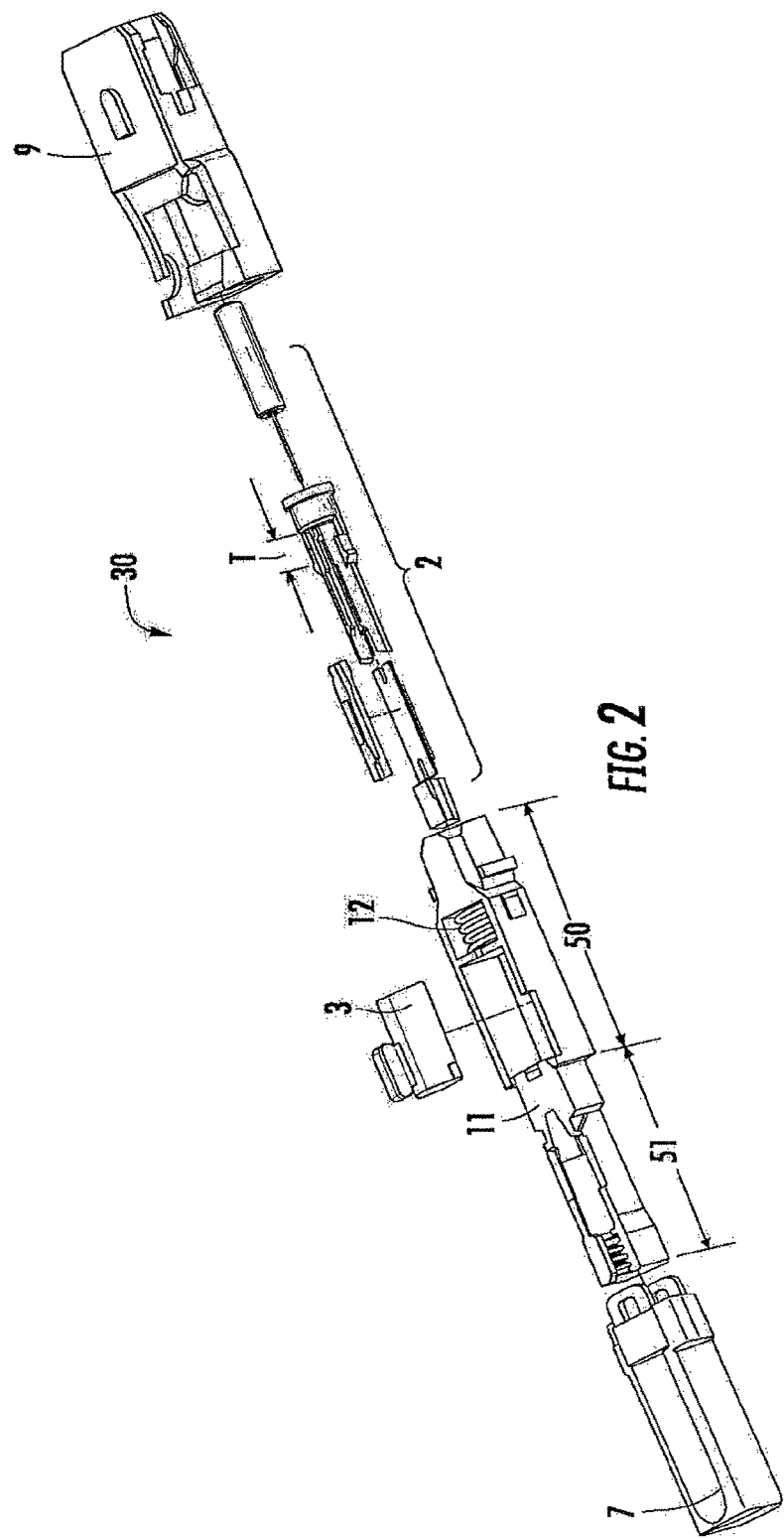
FIG. 2 is a partially exploded view of a fiber optic connector 30 shown in FIG. 1.

FIG. 1 depicts a perspective view of an exemplary cable assembly 10 for explaining the concepts and principles of the present disclosure. The cable assembly 10 has a fiber optic connector 30 as best shown in FIG. 2. As shown in FIG. 1, the cable assembly 10 comprises a cam 3, a connector holder 7 and a connector housing (or shroud) 9 that have been assembled as one unit to connect the fiber optic cable 100 onto the fiber optic connector 30.

FIG. 2 depicts a partially exploded view of the fiber optic connector 30 shown in FIG. 1. As shown in FIG. 2, the fiber optic connector 30 comprises a mechanical splice assembly 2, the cam 3 for activating the mechanical splice assembly 2, a connector body 11, the connector holder 7, a spring 12 for biasing the mechanical splice assembly 2 along the forward direction, and the connector housing (or shroud) 9. Although the explanatory embodiments illustrate an actuator configured as a cam, other embodiments may use other suitable actuators for biasing the splice parts together for securing the optical fibers between the mechanical splice. By way of example, the actuation may be a linear slide or have a spring actuator as desired.

Figure 3A:
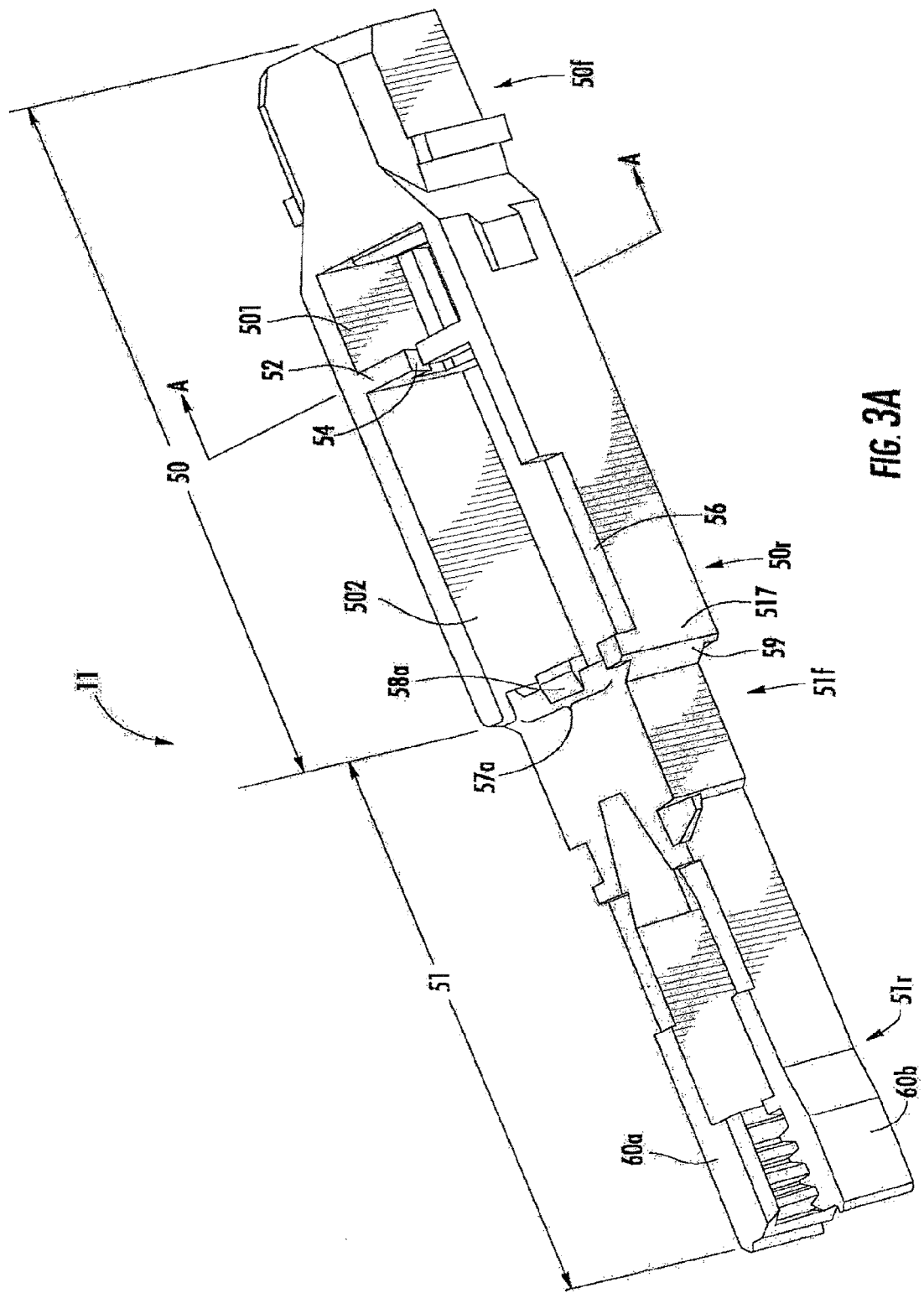

FIGS. 3A-B depict enlarged top and bottom perspective views of the connector body 11 shown in FIG. 2. As shown in FIG. 3A, the connector body 11 comprises a first portion (or component portion) 50 and a second portion (or clamp portion) 51 (also shown in FIG. 2). The first portion 50 of the connector body 11 has a front end $50_f$ and a rear end $50_r$, and the second portion 51 of the connector body 11 has a front end $51_f$ and a rear end $51_r$. On the connector body 11, front end $51_f$ on the second portion 51 is joined with the rear end $50_r$ of the first portion 50 at a joint section 517. The first portion 50 and second portion 51 are made as one unit (or one piece), preferably using plastic materials.

In FIG. 3A, the first portion 50 of the connector body 11 includes a first chamber 501, which can accommodate the spring 12 and a first portion 55 (shown in FIG. 5) of a mechanical splice assembly body 5, and a second chamber 502, which is configured along the elongate direction of the first portion 50 for accommodating the cam 3 and a second portion 56 (shown in FIG. 5) of the mechanical splice assembly body 5. The first portion 50 further includes an opening 503 (shown in FIG. 4B) on its front end $50_f$ that passes through the first chamber 501 into the second chamber 502 along the elongate direction of the first portion 50 so that the mechanical splice assembly 2 can be inserted through the first chamber 501 into the second chamber 502 using the opening 503. The second portion 51 of the connector body 11 includes a pair of cable retention arms 60 (60a, 60b) that extend out from the rear end $50_r$ of the first portion 50 (or from the joint section 517). The second portion 51 of the connector body 11 further includes an opening 511 (shown in FIG. 8) at (or near to) its front end $51_f$ that leads into the second chamber 502 so that an optical fiber 102 (shown in FIG. 12A) in a fiber optic cable 100 can be inserted into the second chamber 502 on the first portion 50 of the connector body 11 through the opening 511. To separate the first chamber 501 and second chamber 502, a wall 52 (also see FIG. 4A) is configured between the first chamber 501 and second chamber 502.

In FIG. 3A, as one explanatory embodiment, the first portion 50 and second portion 51 of the connector body 11 are manufactured as one unit or one piece (i.e., a monolithic construction) in which the second portion 51 is extended out from the first portion 50 (or from the joint section 517). Because the cross section of the first portion 50 is larger than that of the second portion 51, a shoulder 59 is formed in the joint section 517 between the first portion 50 and second portion 51. The shoulder 59 is used to stop the connector holder 7 when the second portion 51 of the connector body 11 is inserted into the connector holder 7, but other configurations are possible. Of course, non-monolithic construction is possible. However, the monolithic construction of the connector body 11 enables the fiber optic connectors to have some advantages, such as more compact size, being easier to manufacture, easier to assemble and more robust in field installation, and the like. More specifically, as one unit of the connector body 11, (which is preferably made from plastic material), the first portion 50 can accommodate and retain all major splice components while the second portion can accommodate and retain a fiber optic cable.

Figure 8A:
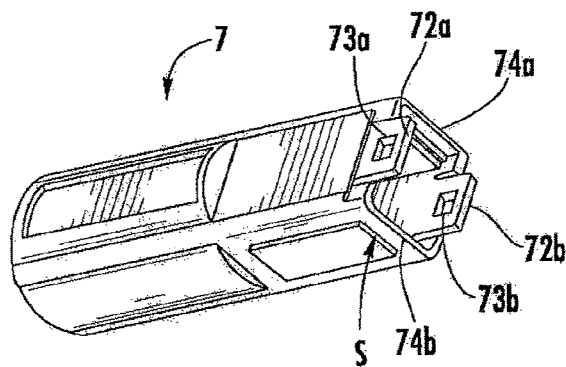
FIGS. 8A-C depict a connector holder 7 shown in FIG. 1 in greater detail.

In FIG. 3A, the second chamber 502 of the connector body 11 may further comprise a side notch 56 for accommodating a cam handle 86 (shown in FIG. 10A) if used on the cam 3 when the cam 3 is rotated into an activated position (see FIG. 1). An opening 57a is configured on the shoulder 59, and a latch 58a is configured in the front of or between the opening 57a on the top surface at (or near to) the front end $51_f$ of the second portion 51 (or the joint section 517). Symmetrically, as shown in FIG. 3B, an opening 57b is configured on the shoulder 59, and a latch 58b is configured in a position in the front of or between the opening 57b on the bottom surface at (or near to) the front end 51. f of the second portion 51 (or the joint section 517). The two openings 57a and 57b are used to receive latch ears 72a and 72b on the connector holder 7 as shown in FIG. 8A. To better secure the connector holder 7, each of the two latches 58a, 58b has an ascending slope. It should be appreciated by a person in the field, other structures are possible for securing the connector holder 7 with the second portion 51 of the connector body 11.

Figure 4A:
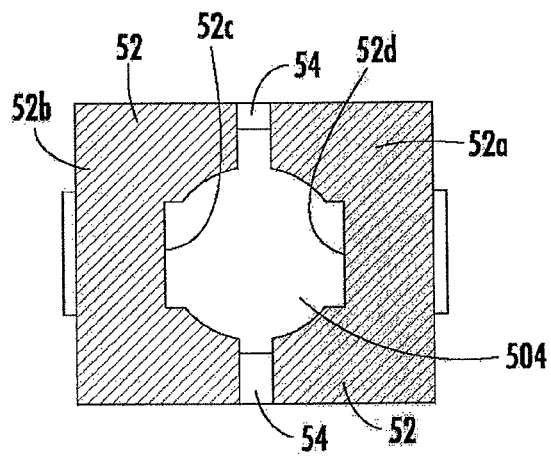
FIG. 4A is a sectional view along line A-A shown in FIG. 3A.

FIG. 4A depicts a sectional view of the separation wall 52 along line A-A shown in FIG. 3A. As shown in FIG. 4A, the separation wall 52 includes an opening 504 and a slot 54, which is configured in (or near to) the middle location of the separation wall 52 to separate the separation wall 52 into two wall sections 52a, 52b. Two grooves 52c, 52d are configured on the two wall sections 52a, 52b, respectively, to match the profile of the second portion 56 of the mechanical splice assembly body 5 (shown in FIG. 5).

Figure 4B:
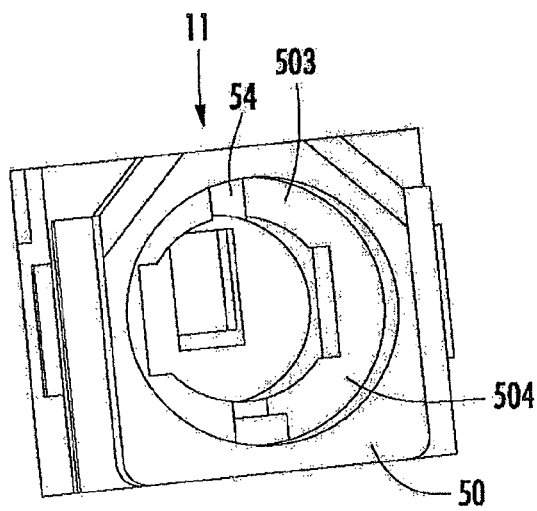
FIG. 4B is a front perspective view showing a front opening 503 on a first portion 50 of the connector body 11 shown in FIG. 2.

FIG. 4B depicts a front perspective view showing the front opening 503 on the first portion 50 of the connector body 11 shown in FIG. 2. In installation, the mechanical splice assembly 2 can be inserted through the opening 503, and then through opening 504 to reach the second chamber 502 on the connector body 11.

Figure 5:
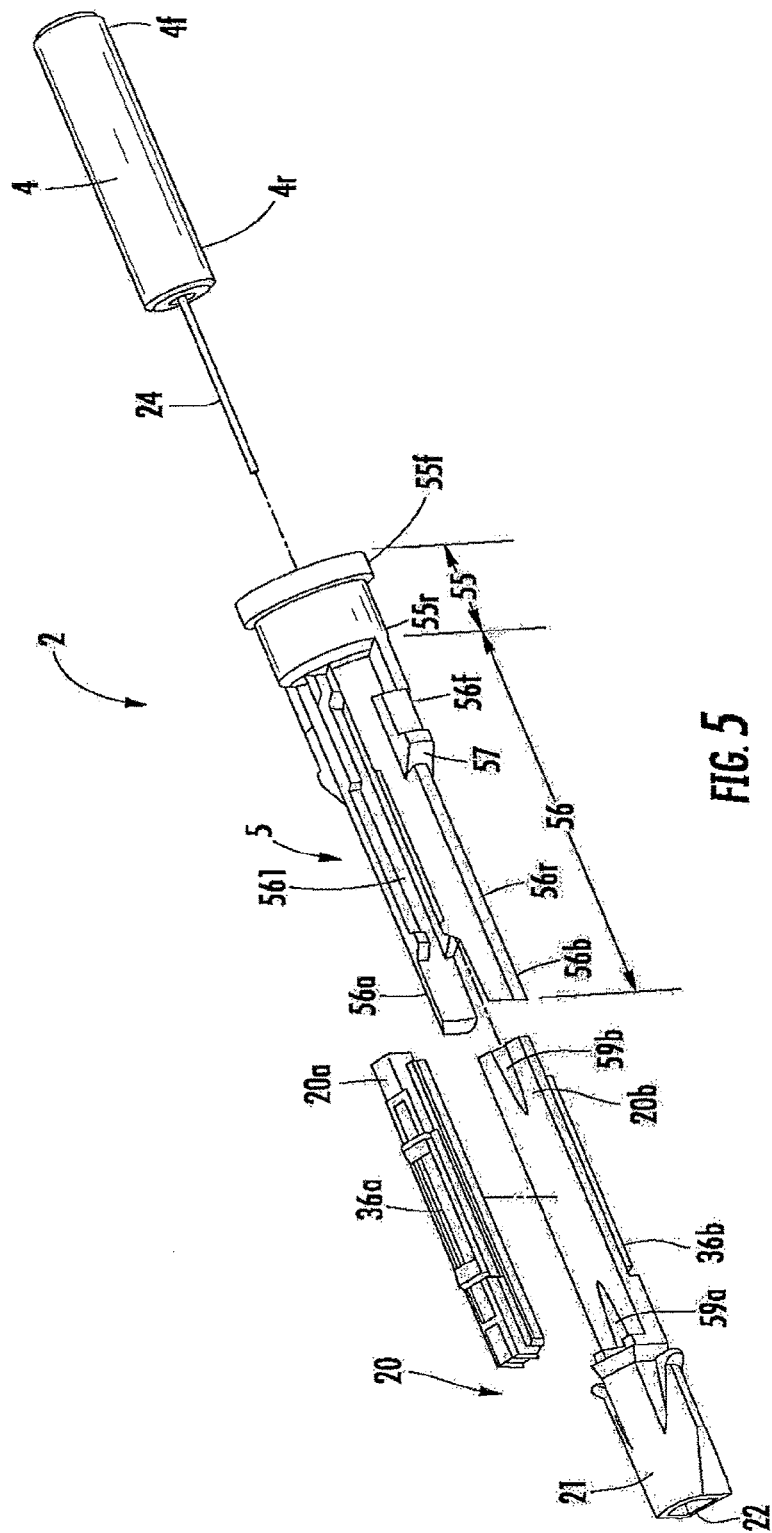
FIG. 5 is the mechanical splice assembly shown in FIG. 2 in greater detail.

FIG. 5 depicts the mechanical splice assembly 2 shown in FIG. 2 in greater detail. As shown in FIG. 5, the mechanical splice assembly 2 comprises a ferrule 4 having a frond end $4_f$, a rear end $4_r$, and a stub optical fiber 24 extending out from its rear end $4_r$; the mechanical splice assembly body 5 including the first portion (or ferrule holder portion) 55 and the second portion (or splice holder portion) 56; and a mechanical splice 20 including a first splice part 20a and a second splice part 20b. The first portion 55 of the mechanical splice assembly body 5 has a front end $55_f$ and a rear end $55_r$; the second portion 56 of the mechanical splice assembly body 5 has a front end $56_f$ and a rear end $56_r$. The front end $56_f$ of the second portion 56 is joined with the rear end $55_r$ of the first portion 55. The second portion 56 of the mechanical splice assembly body 5 has a slot 561, which separates the second portion 56 into two parts 56a, 56b, for receiving the first slice part 20a and second splice part 20b into the second portion 56 of the mechanical splice assembly body 5, and a lead-in portion 562 (shown in FIG. 7) at the front end of the second portion 56.

As shown in FIG. 5, the second slice part 20b includes a splice head 21 having a lead-in portion 555 (shown in FIG. 12A) that passes through the splice head 21. An opening 22 is configured at the distal end of the lead-in portion 555 so that when the first splice part 20a and second splice part 20b are installed within the second chamber 502 of the connector body 11, the opening 22 on the lead-in portion 555 is aligned with the opening 511 on the connector body 11. In assembling, the first splice part 20a is placed onto the second splice part 20b. One end of the first splice part 20a touches the splice head 21.

To receive the bias force from the cam 3, two keels 36a, 36b are configured on the backs of the first and second splices 20a, 20b, respectively. To facilitate inserting the optical fiber 102 on the fiber optic cable 100 and the stub optical fiber 24 on the ferrule 4, both the lead-in portion 555 on the splice head 21 and the lead-in portion 562 on the mechanical splice assembly body 5 have a funnel-shaped channel. To better guide the optical fibers on the fiber optic cables, the second splice part 20b includes two grooves 59a and 59b (see FIG. 5). Symmetrically, the first splice part 20a includes two grooves (not shown).

It should be appreciated that, because the second slice part 20b is manufactured separate from the connector body 11, it is easier and cheaper to make a lead-in portion for guiding an optical fiber on the second slice part 20b than on the connector body 11. In addition, it is easier and more accurate for a craft to insert an optical fiber between the two splice parts by configuring a lead-in portion on a head that is made as one unit of the second splice part 20b because the lead-in portion is directly aligned with and connected to the groove 59a on the second splice part 20b.

Figure 6A:
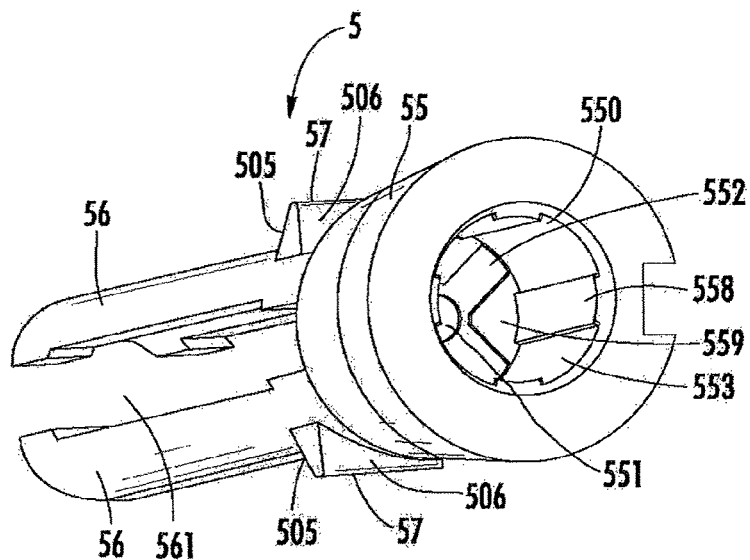
FIG. 6A is a front elevation view of the mechanical splice assembly body 5 shown in FIG. 5.

FIG. 6A depicts the front perspective view of the mechanical splice assembly body 5 shown in FIG. 5. As shown in FIG. 6A, the first portion 55 of the mechanical splice assembly body 5 has a ferrule housing 550 with a bottom 559 for accommodating the ferrule 4. The bottom 559 of the ferrule housing 550 has an opening 551 that passes through the bottom 559 into the second portion 56 of the mechanical splice assembly body 5. To inject adhesive materials (such as resin) into the ferrule housing 550, one or more adhesive distribution channels 552 are configured on the bottom 559 and one or more adhesive distribution channels 553 are configured around the inner wall 558 of the ferrule housing 550.

In FIG. 6A, two fins 57 are configured on the two sections 56a, 56b, respectively, which are projected outward on the outer wall and located near to the front end $56_f$ of the second portion 56 of the mechanical splice assembly body 5. Each of the two fins 57 has a tapered surface 505 that ascends towards and a flat surface 506 that faces the first portion 55 of mechanical splice assembly body 5. The two tapered surfaces 505 on the two fins 57 can push the slot 54 on the separation wall 52 open so that the second portion 56 of the mechanical splice assembly body 5 can be inserted into the second chamber 502 on the connector body 11. On the other hand, after the mechanical splice assembly body 5 is inserted into the second chamber 502, the two flat surfaces 506 on the two fins 57 can inhibit the second portion 56 of the mechanical splice assembly body 5 from being pulled out from the second chamber 502 on the connector body 11. A distance T (shown in FIG. 2) is configured between flat surfaces 506 and edge of the first portion 55 of the mechanical splice assembly body 5 which allows the mechanical splice assembly body 5 to move along its elongate direction within the fiber optic connector 30.

Figure 6B:
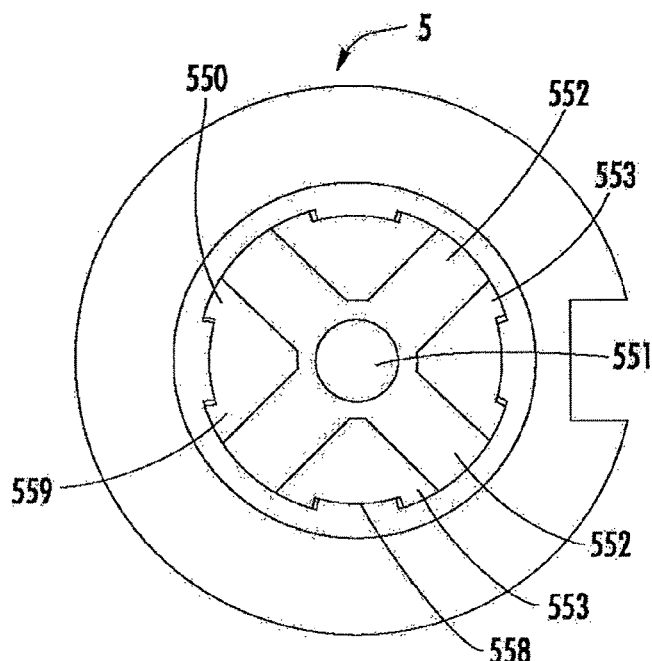
FIG. 6B is the front view of the mechanical splice assembly body 5 shown in FIG. 5.

FIG. 6B depicts the front view of the mechanical splice assembly body 5 shown in FIG. 5. As shown in FIG. 6B, four adhesive distribution channels 552 are configured around the opening 551 on the bottom 559 and four adhesive distribution channels 553 are configured on the inner wall 558 of the ferrule housing 550. It should be appreciated to a person skilled in the field that other configurations (i.e. more or less than four adhesive distribution channels or more or less than two fins) are possible.

Figure 7:
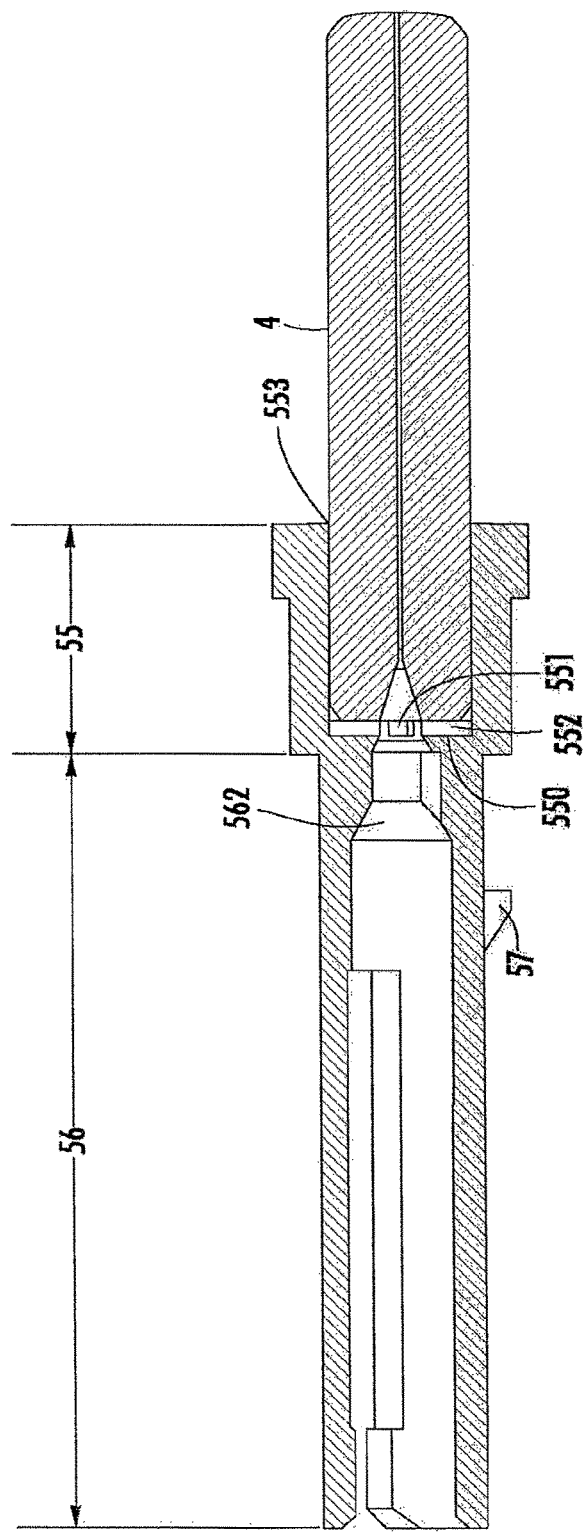
FIG. 7 is a sectional view of a ferrule 4 and the mechanical splice assembly body 5 after the ferrule 4 is installed into a ferrule housing 550 on the mechanical splice assembly body 5.

FIG. 7 depicts a sectional view of the ferrule 4 and the mechanical splice assembly body 5 after the ferrule 4 is installed into the ferrule housing 550 on the mechanical splice assembly body 5. As shown in FIG. 7, the bottom 559 of the ferrule housing 550 includes the opening 551, which is aligned with the lead-in portion 562 on the second portion 56, so that after the ferrule 4 is installed into the ferrule housing 550, the stub optical fiber 24 on the ferrule 4 can be inserted into the lead-in portion 562 through the opening 551. In FIG. 7, the stub optical fiber 24 is omitted to better show the alignment between the opening 551 and lead-in portion 562. Also as shown in FIG. 7, the four (but two are shown in the sectional view) adhesive distribution channels 552 are configured around the opening 551 on the bottom 559 of the ferrule housing 550 so that, in manufacturing the fiber optic connector 30, the adhesive can be injected into the adhesive distribution channels 552 through the opening 551. The injected adhesive further passes through the adhesive distribution channels 552 on the bottom 559 to reach adhesive distribution channels 553 on the inner wall 558. It should be noted that the mechanical splice assembly body 5 is made as one unit (or piece), preferably using plastic materials. The monolithic construction of the mechanical splice assembly body 5 enables the fiber optic connectors to have some advantages, such as more compact size, being easier to manufacture, easier to assemble and more robust in field installation, and the like. More specifically, as one unit of the mechanical splice assembly body 5, the first portion 55 can accommodate and retain ferrule 4 while the second portion 56 can accommodate and retain the first and second splice parts 20a, 20b.

Figure 8B:
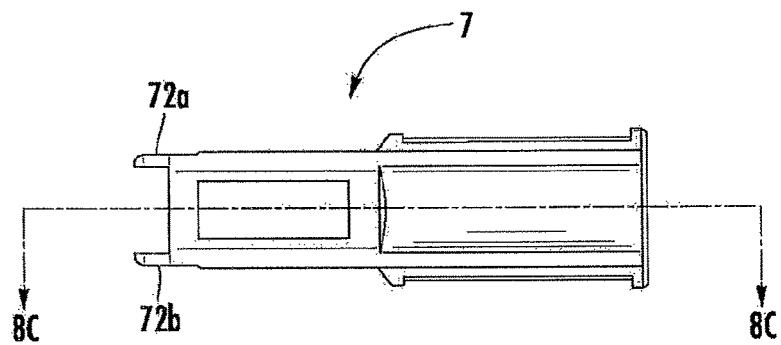
Figure 8C:
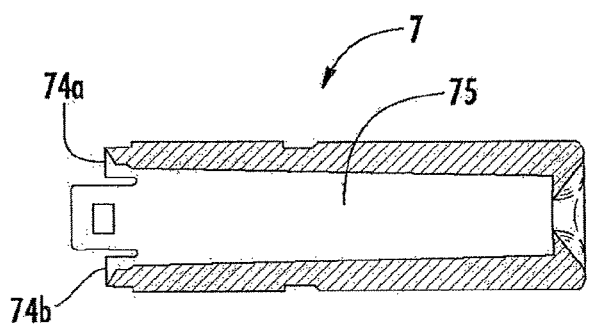

FIGS. 8A-C depict the connector holder 7 of FIG. 1 in greater detail. As shown in FIG. 8A, the connector holder 7 comprises two front edges 74a, 74b and the two latch ears 72a and 72b. The two front edges 74a, 74b and two latch ears 72a, 72b are configured symmetrically opposite to each other around the body of the clamp holder 7. Two latch mechanisms 73a and 73b, such as openings or windows, are configured on the latch ears 72a and 72b, respectively, for securing the connector holder 7.

FIG. 8B depicts the side view of the connector holder 7 in FIG. 8A. As shown in FIG. 8B, the two latch ears 72a and 72b on the connector holder 7 extend out exceeding the edges of two front edges 74a and 74b.

FIG. 8C depicts a cross sectional view of FIG. 8B along the direction 8C-8C. As shown in FIG. 8C, the connector holder 7 comprises a cavity 75 having a passageway with a gradually reduced dimension, which is used to squeeze the cable retention arms 60a and 60b together when the second portion 51 of the connector body 11 is inserted into the cavity 75 of the connector holder 7. The cavity 75 is configured so that a fiber optic cable can be loosely disposed between the two cable retention arms 60a and 60b when they enter into the passageway of the cavity 75. As the two cable retention arms 60a and 60b gradually move deeper into the passageway, the cavity 75 gradually decreases, thereby squeezing the two cable retention arms 60a and 60b together to grip the fiber optic cable therebetween. The movement stops when the front edges 74a, 74b of the connector holder 7 meet the shoulder 59 on the connector body 11.

Figure 9A:
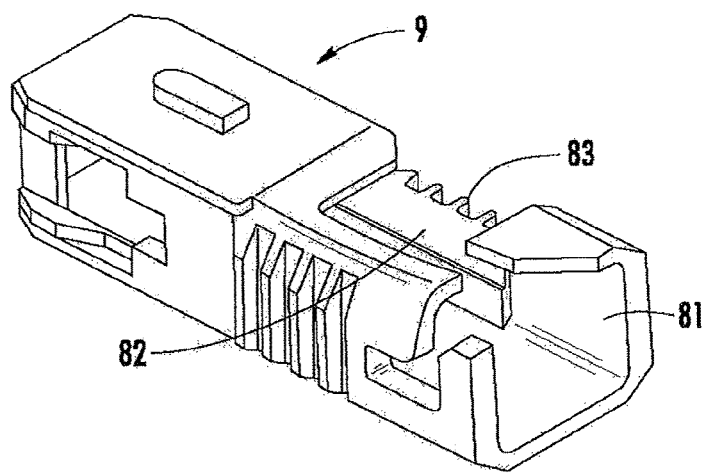
FIGS. 9A-B are two perspective views of the connector housing 9 of FIG. 2 in greater detail.
Figure 9B:
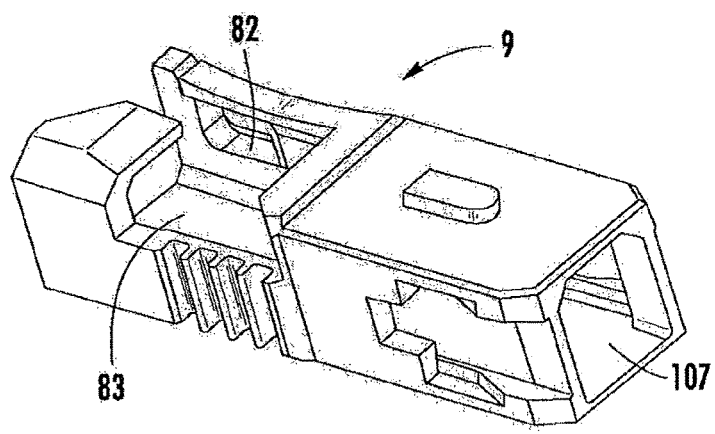

FIGS. 9A-B depict two perspective views of the connector housing 9 of FIG. 2 in greater detail. As shown in FIG. 9A, the connector housing 9 comprises an opening 81 at its rear end for receiving the connector body 11; a U-shaped window 82 for accommodating the cam 3; and a sliding slot 83 located at the open edge of the U-shaped window 82 so that the cam handle 86 (shown in FIG. 10) can slide back and forth along the sliding slot 83 when the cam 3 is placed in the locking position. As shown in FIG. 9B, the connector housing 9 includes a opening 107 at its front end.

Figure 10:
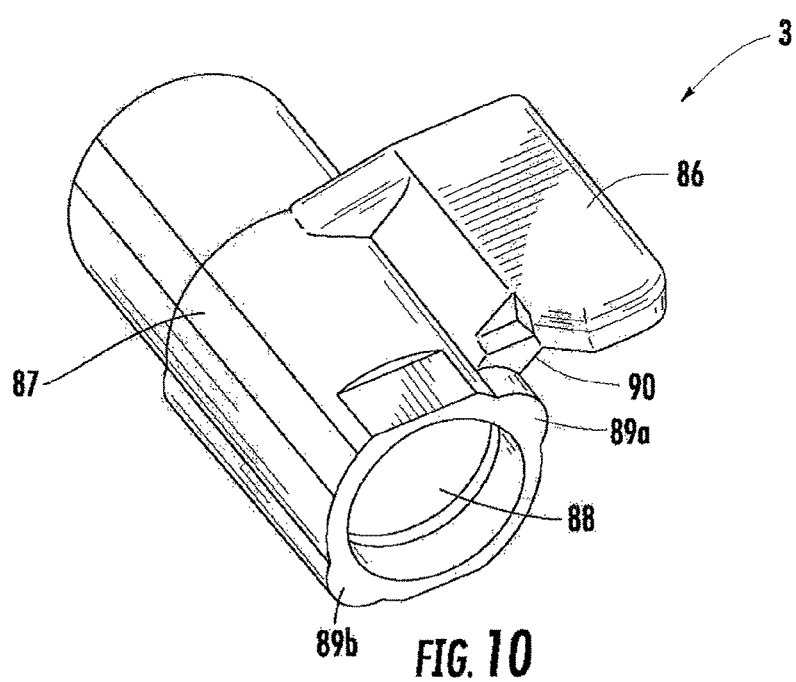
FIG. 10 is a perspective view of a cam 3 shown in FIG. 2.

FIG. 10 depicts a perspective view of the cam 3 in FIG. 2. As shown in FIG. 10, the cam 3 comprises a handle 86 and a body 87. The cam handle 86 has a notch 90 for receiving the latch ears 72a on the connector holder 7 when the second portion 51 of the connector body 11 is inserted into the connector holder 7. The cam body 87 further comprises a through hole 88 with an eccentric circumference for receiving and accommodating the two splice parts 20a, 20b and the second portion 56 of the mechanical splice assembly body 5 and a pair of symmetrically arranged protrusions 89a and 89b for lifting the two latch ears 72a and 72b on the connector holder 7. To properly lift the latch ear 72a on the connector holder 7, the protrusion 89a is configured below or adjacent to the notch 90 on the cam handle 86 so that when the second portion 51 of the connector body 11 is inserted into the connector holder 7, the latch ear 72a on the connector holder 7 is placed over the protrusion 89a on the cam 3 when the cam 3 is in the releasing position. In installation, to mount the cam 3 onto the second portion 56 of the mechanical splice assembly body 5, the second portion 56 of the mechanical splice assembly body 5 is inserted into the through hole 88 on the cam 3. When the cam 3 is in a released position, the second portion 56 of the mechanical splice assembly body 5 is loosely placed within the through hole 88. But when the cam 3 is rotated into the locked position, the eccentric portion on the through hole 88 is pressed against the keels 36 on the top surfaces of the splice parts 20a, 20b so that the splice parts 20a and 20b can grip the optical fiber 102 in the fiber optic cable 100 and the stub optical fiber 24 therebetween.

Figure 11:
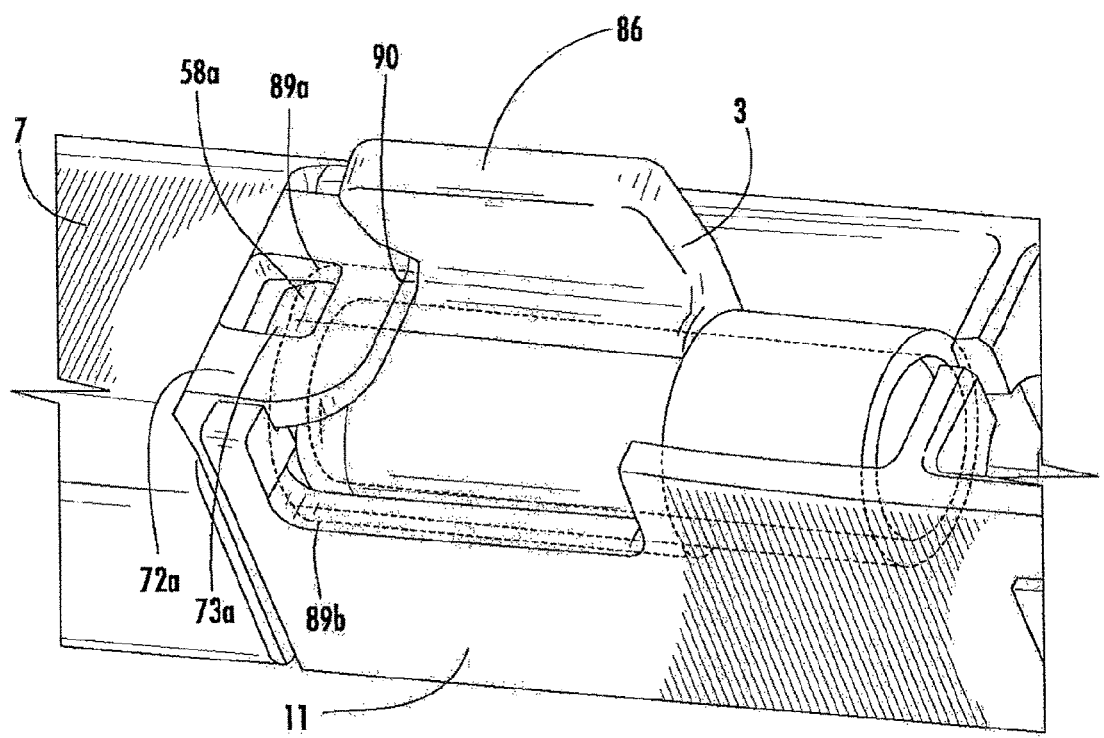
FIG. 11 is a perspective view illustrating how to assemble the cam 3, the connector body 11, and the connector holder 7 together.

FIG. 11 depicts a perspective view to illustrate how to assemble the cam 3, the second portion 51 of the connector body 11, and the connector holder 7 together when the cam 3 is in a releasing position.

As shown in FIG. 11, because the latch ear 72a on the connector holder 7 is inserted through the opening 57a on the top surface of the connector body 11 and the left edge of the latch ear 72a is inserted into the notch 90 on the cam handle 86, the latch mechanism 73a on the latch ear 72a is aligned with the latch 58a on the connector body 11. However, because the latch ear 72a on the connector holder 7 is placed on the protrusion 89a on the cam 3, the latch mechanism 73a on the latch ear 72a is lifted above the latch 58a on the connector body 11, thus preventing the latch 58a from being snapped/clipped into the latch mechanism 73a. Due to the symmetrical arrangement, the latch ear 72b on the connector holder 7 is also inserted through the opening 57b on the bottom surface of the connector body 11, causing the latch mechanism 73b on the latch ear 72b aligned with the latch 58b on the connector body 11. However, because the latch ear 72b on the connector holder 7 is placed on the protrusion 89b on the cam 3, the latch mechanism 73b on the latch ear 72b is lifted above the latch 58b on the connector body 11, thus preventing the latch 58b from being snapped/clipped into the latch mechanism 73b. Therefore, in FIG. 11, the cam 3 is in the releasing position where the connector body 11 can be freely pushed into or pulled out from the connector holder 7.

In an activating operation, when the cam 3 is rotated from the releasing position as shown in FIG. 11 to the locking position as shown FIG. 1, the latches 58a and 58b on the connector body 11 are snapped/clipped into the latch mechanisms 73a and 73b on the connector holder 7, thus attaching the connector body 11 onto the connector holder 7. More specifically, when the cam handle 86 is being rotated cross over the latch ear 72a from its left edge to its right edge, the two protrusions 89a and 89b on the cam body 87 are being moved away from the latch ears 72a and 72b on the connector holder 7. When the cam handle 86 reaches the sliding slot 83 on the connector housing 9, the two protrusions 89a and 89b on the cam body 87 are moved out from the latch ears 72a and 72b on the connector holder 7. Consequently, the two latches 58a and 58b on the connector body 11 snap/clip into the two latch mechanisms 73a and 73b on the clamp holder 7, thus attaching the connector body 11 onto the connector holder 7.

In a deactivating operation, when the cam 3 is being rotated from the locking position to the releasing position, the two latch mechanisms 73a and 73b on the connector holder 7 are lifted from the two latches 58a and 58b on the connector body 11, thus releasing the connector body 11 from the connector holder 7. More specifically, when the cam handle 86 is being rotated cross over the latch ear 72a from its right edge to its left edge, the two protrusions 89a and 89b on the cam body 87 are being moved towards the latch ears 72a and 72b on the connector holder 7. When the cam handle 86 reaches the left edge of the latch ear 72a, the two protrusions 89a and 89b on the cam body 87 are moved under the latch ears 72a and 72b on the connector holder 7. Consequently, the two latch mechanisms 73a and 73b on the connector holder 7 are lifted away from the two latches 58a and 58b on the connector body 11, thus releasing the connector body 11 from the connector holder 7.

It should be appreciated the fiber optic connector 30 disclosed provides activation/deactivation mechanism that is easy to operate without requiring any tools and without damaging any components in activating/deactivating operation. It should also be appreciated the fiber optic cable 100 that is connected to fiber optic connector 30 can sustain larger pulling force if a user inadvertently pulls the connector holder 7 because the pulling force is sustained (or most of the pulling force is sustained) by the two latches 58a and 58b on connector body 11 and the two latch ears 72a and 72b on the connector holder 7, not by the fiber optic cable to be connected. Consequently, the fiber optic connector 30 is reversible without damaging or destroying the same while still providing a robust connector solution.

Figure 12A:
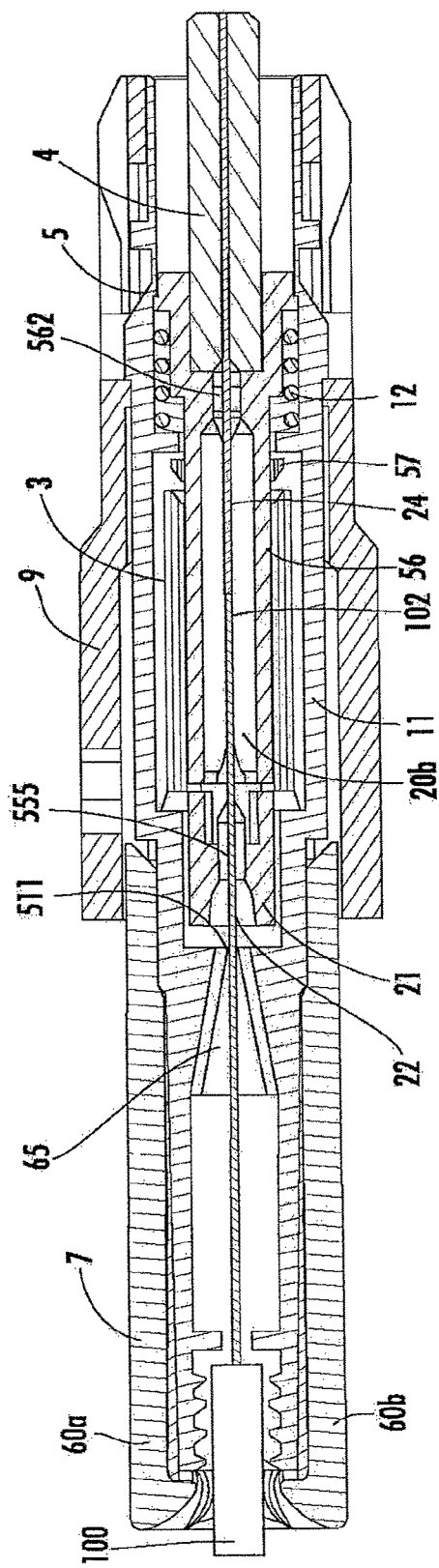
FIG. 12A is a cross-sectional view along line C-C in FIG. 1.

FIG. 12A depicts a cross-sectional view of the fiber optic cable assembly 10 in FIG. 1 using the fiber optic connector 30 shown in FIG. 2 when the cam 3 is in locking position shown in FIG. 1 along line C-C. As shown in FIG. 12A, the first and second splice parts 20a, 20b are inserted into the mechanical splice assembly body 5 through the slot 561 (shown in FIG. 5) and retrained within the mechanical splice assembly body 5. The spring 12 is placed and retained within the first chamber 501 of the connector body 11 while the cam 3 is placed and retained within the second chamber 502. The mechanical splice assembly body 5 is then inserted into the first chamber 501 and second chamber 502 through the openings 503 and 504 so that the mechanical splice assembly body 5 passes through the inner hole of the cam 3 and spring 12. The fiber optic cable 100 is inserted between and gripped by the cable retention arms 60a, 60b on the second portion (or clamp portion) 51 of the connector body 11, while the stub optical fiber 24 is inserted between and gripped by the splice parts 20a and 20b on the mechanical splice assembly 2. The optical fiber 102 on the fiber optic cable 100 is inserted into the splice parts 20a and 20b through opening 511 under the guidance of the groove 65 on the second portion 51 of the connector body 11 and the lead-in portion 555 on the splice head 21 of the second splice part 20b.

In FIG. 12A, when the mechanical splice assembly body 5 is being pushed through the opening 504 on the separation wall 52, the tapered surfaces 505 on the two fins 57 push the slot 54 on the separation wall 52 open. However, after the mechanical splice assembly body 5 is pushed through the opening 504, the slot 54 returns to its normal shape to retain the mechanical splice assembly body 5 within the second chamber 502 by locking the two fins 57. The ferrule 4 is fixed (or fastened) in the ferrule housing 550 by adhesive materials (such as resin including epoxy resin). The adhesive materials are injected into the distribution channels 552 and 553 in the ferrule housing 550 through the opening 551 shown in FIG. 6B. Because the distribution channels 552 and 553 are configured on the inner wall 558 and the bottom 559 of the ferrule housing, the ferrule 4 is solidly fixed (or fastened) onto the ferrule housing 550 around the inner wall 558 and over the bottom 559 of the ferrule housing 550. Therefore, the structure of the fiber optic connector 30 in the present disclosure allows using low cost resin (such as epoxy resin) without compromising adhesive quality.

To allow the mechanical splice assembly body 5 to make slight (or desirable) swing movement perpendicular (or transverse) to the elongate direction of the mechanical splice assembly body 5 in installing a fiber optic cable, the openings 503 and 504 hold the outer wall of the first portion 55 on the mechanical splice assembly body 5 in a clearance fit manner.

Figure 12B:
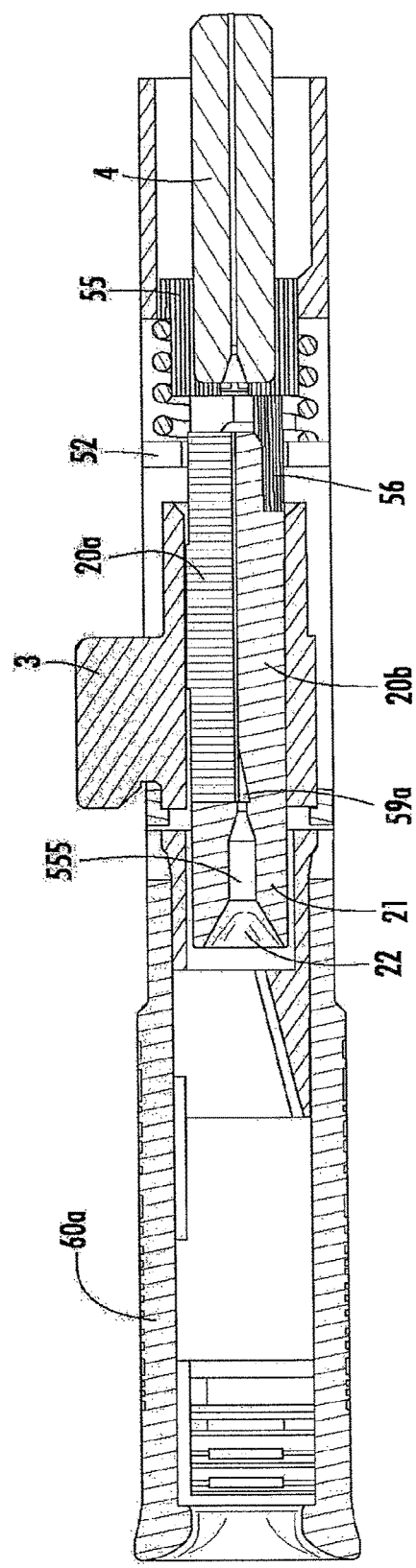
FIG. 12B is a cross-sectional view of the fiber optic connector 30 shown FIG. 1 when the cam 3 is in releasing position along line D-D.

FIG. 12B depicts a cross-sectional view of the fiber optic connector 30 shown FIG. 1 when the cam 3 is in releasing position along line D-D. It should be noted that to better show the position of the cam 3 and two splice parts 20a, 20b, the connector holder 7, connector housing 9, and stub optical fiber 24 are omitted from FIG. 12B.

It should be appreciated that the structure of the fiber optic connector 30 in the present disclosure avoids rigid connection between the connector body 11 and the mechanical splice assembly body 5. Instead, the spring 12 provides elastic connection between the connector body 11 and the mechanical splice assembly body 5, which is able to isolate the mechanical splice assembly body 5 from the connector body 11 when a fiber optic cable is being installed onto the connector body 11. Specifically, in installing a fiber optic cable onto the fiber optic connector 30, when the connector body 11 moves in its elongate direction, the spring 12 allow the mechanical splice assembly body 5 to move in the elongate direction. In addition, when the connector body 11 swings perpendicular (or transverse) to its elongate direction, it will not rigidly move the mechanical splice assembly body 5 due to the clearance fit between the openings 503 and 504 and the outer wall of the first portion 55 on the mechanical splice assembly body 5. Such an elastic connection between the connector body 11 and the mechanical splice assembly body 5 prevents the mechanical splice assembly body 5 from being broken in fiber optic cable installation and use of the fiber optic connector 30.

Figure 13:
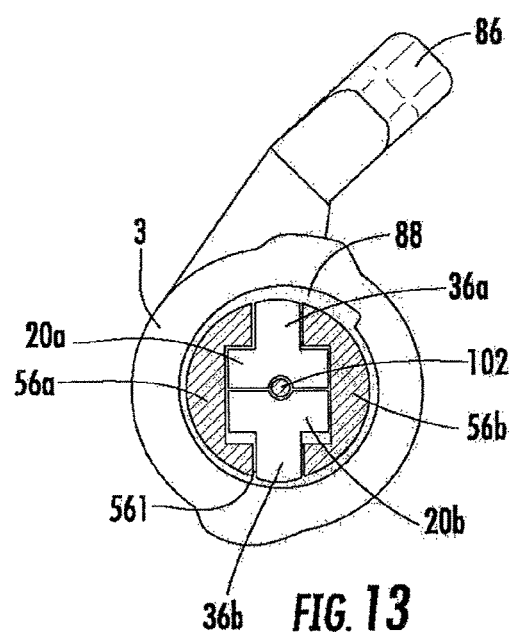
FIG. 13 is a sectional view illustrating how to assemble the cam 3 and the mechanical splice assembly 2 together.

FIG. 13 depicts a sectional view to illustrate how to assemble the cam 3 and the mechanical splice assembly 2 together. As shown in FIG. 13, the first and second slice parts 20a, 20b are installed into the slot 561 on the second portion 56 of the mechanical splice assembly body 5, and the mechanical splice assembly body 5 are installed into the hole 88 of the cam 3.

To facilitate assembly and maintenance, some or all of the components for the fiber optic connector 30 can be made using translucent materials. By way of example, the cam 3 and/or some or all of the splice parts may be translucent so the craft can verify the mechanical splice. In other words, the craft can illuminate the fibers and monitor the glow when making the mechanical splice between the fibers and thereby verify the quality of the mechanical splice based upon strength of the escaping light at the mechanical splice interface.

It should be appreciated the structure disclosed can provide more compact design for fiber optic connectors. In particular, the structure disclosed can reduce the length of the existing fiber optic connectors, at least for three reasons: (1) the spring 12 is placed in the first chamber 501 and the cam 3 is paced in the second chamber 502 of the connector body 11, while the splice assembly body 5 is also inserted into and retained in the first and second chambers 501, 502, (2) the first portion 50 of the connector body 11 accommodates and retains major splice components while the second portion 51 accommodates and retains a fiber optic cable, and (3) the first portion 50 of the connector body 11 is inserted into the connector housing 9 while the second portion 51 of the connector body 11 is inserted into the connector holder 7. In other words, these components overlap along longitudinal direction of the fiber optic connector which makes the fiber optic connectors of the present disclosure more compact comparing with the existing fiber optic connectors.

In addition, the structure disclosed provides a fiber optic connector with improved durability and robust due to its structural features, which is easy to assemble and/or install in the field.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:
1. A fiber optic connector, comprising:
 a mechanical splice assembly comprising:
  a first splice part and a second splice part;

a ferrule having a front end and a rear end, and including a stub optical fiber extending out from the rear end of the ferrule; and a mechanical splice assembly body including a first portion configured to retain the ferrule and a second portion configured to retain the first and second splice parts;

wherein the first portion of the mechanical splice assembly body has a front end and a rear end and the second portion of the mechanical splice assembly body has a front end and a rear end, and the front end of the second portion of the mechanical splice assembly body is joined with the rear end of the first portion of the mechanical splice assembly body; and wherein the first portion of the mechanical splice assembly body defines a ferrule housing configured to accommodate the ferrule, the ferrule housing having a bottom with an opening that passes into the second portion of the mechanical splice assembly body; and a connector body including a first portion and a second portion, wherein the first portion of the connector body has a front end and a rear end and the second portion of the connector body has a front end and a rear end, and the rear end of the first portion of the connector body is joined with the front end of the second portion of the connector body;

wherein the first portion of the connector body includes a first chamber and a second chamber along an elongate direction of the first portion of the connector body, and the first portion of the connector body further includes an opening on its front end that passes through the first chamber into the second chamber along the elongate direction of the first portion of the connector body, whereby the mechanical splice assembly can be inserted through the first chamber into the second chamber using the opening on the first portion of the connector body, and wherein the second portion of the connector body includes cable retention arms that extend out from the rear end of the first portion of the connector body, and the second portion further includes an opening on its front end that passes into the second chamber.

2. The fiber optic connector of claim 1, wherein:
the first portion of the connector body is configured to retain the mechanical splice assembly and the second portion of the connector body is configured to retain a fiber optic cable.

3. The fiber optic connector of claim 1, wherein:
the second portion of the mechanical splice assembly body has a slot configured to accommodate the first slice part and second splice part.

4. The fiber optic connector of claim 1, wherein:
the second portion of the mechanical splice assembly body has a lead-in portion at the front end of the second portion of the mechanical splice assembly body whereby the stub optical fiber on the ferrule can be inserted into the second portion of the mechanical splice assembly body through the lead-in portion.

5. The fiber optic connector of claim 1, wherein:
the bottom of the ferrule housing includes adhesive channels; and
side walls of the ferrule housing includes adhesive channels.

6. The fiber optic connector of claim 1, wherein:
the second chamber on the connector body is configured to retain the second portion of the mechanical splice assembly body and the first and second splice parts.

7. The fiber optic connector of claim 1, wherein:
the second splice part includes a splice head having a lead-in portion that passes through the splice head so that when the first splice part and second splice part are installed in the second chamber of the connector body, an opening on the lead-in portion of the splice head is aligned with the opening on the connector body.

8. The fiber optic connector of claim 7, wherein:
the lead-in portion of the splice head has a funnel-shaped channel; and
the lead-in portion on the mechanical splice assembly body has a funnel-shaped channel.

9. The fiber optic connector of claim 1, wherein:
an optical fiber of an fiber optic cable can be inserted into the second chamber on the first portion of the connector body through the opening on the second portion of the connector body.

10. The fiber optic connector of claim 1, further comprising:
a separation wall arranged between the first chamber and the second chamber of the connector body, wherein the separation wall includes an opening that aligns with the opening on the first portion of the connector body, and further wherein the separation wall includes a slot.

11. The fiber optic connector of claim 10, wherein:
the mechanical splice assembly body comprises at least one fin projected outward from an outer surface of the second portion of the mechanical splice assembly body;
the at least one fin is configured to push the slot on the separation wall open so that the second portion of the mechanical splice assembly body can be inserted through the opening of the separation wall and into the second chamber of the connector body; and
the at least one fin is configured to inhibit the second portion of the mechanical splice assembly body from being pulled out from the second chamber after being inserted through the opening of the separation wall.

12. The fiber optic connector of claim 1, further comprising:
a connector holder configured to receive and accommodate the second portion of the connector body.

13. The fiber optic connector of claim 12, further comprising:
a connector housing configured to receive and accommodate the first portion of the connector body.

14. The fiber optic connector of claim 13, further comprising:
a spring installed in the first chamber on the connector body, wherein the spring is configured to bias the mechanical splice assembly forward when the mechanical splice assembly is in the first chamber of the connector body.

15. The fiber optic connector of claim 14, further comprising:
a cam installed in the second chamber of the connector body, wherein the cam is configured to activate and deactivate the mechanical splice assembly when the mechanical splice assembly is in the second chamber of the connector body.

16. The fiber optic connector of claim 1, wherein the connector body has a monolithic construction.

17. A method for making a cable assembly from a fiber optic cable and a fiber optic connector, the fiber optic cable having an optical fiber, the fiber optic connector comprising a mechanical splice assembly and a connector body, wherein the mechanical splice assembly includes a first splice part and a second splice part, a ferrule having a front end and a rear end, and a mechanical splice assembly body having a first portion configured to retain the ferrule and a second portion configured to retain the first and second splice parts, wherein the ferrule also includes a stub optical fiber extending out from the rear end of the ferrule, wherein the first portion of the mechanical splice assembly body defines a ferrule housing configured to accommodate the ferrule and having a bottom with an opening that passes into the second portion of the mechanical splice assembly body, the method comprising the steps of:

inserting the mechanical splice assembly through an opening on a front end of a first portion of the connector body and into first and second chambers that the first portion of the connector body includes along an elongate direction of the first portion of the connector body, wherein:

the opening on the front end of the first portion of the connector body passes through the first chamber into the second chamber along the elongate direction of the first portion of the connector body so that the mechanical splice assembly is inserted through the first chamber into the second chamber using the opening;

the connector body also includes a second portion with a front end and rear end; and the rear end of the first portion of the connector body is joined with the front end of the second portion of the connector body;

positioning the fiber optic cable in the second portion of the connector body;

inserting the optical fiber of the fiber optic cable into the mechanical splice assembly; and securing the optical fiber of the fiber optic cable in the mechanical splice assembly.

18. The method of claim 17, the second portion of the connector body including cable retention arms extending from the first portion, the method further comprising:

gripping the fiber optic cable with the cable retention arms.

19. The method of claim 18, wherein fiber optic connector further comprises a connector holder for receiving and accommodating the second portion of the connector body, the method further comprising the step of:

inserting the second portion of the connector body into the connector holder, wherein the cable retention arms on the second portion of the connector body are squeezed together to grip the fiber optic cable during the insertion.

20. The method of claim 19, wherein the fiber optic connector further comprises a connector housing for receiving and accommodating the first portion of the connector body, the method further comprising the step of:

inserting the first portion of the connector body into the connector housing.

21. The method of claim 20, wherein the fiber optic connector further comprises a cam for activating and deactivating the mechanical splice assembly, the method further comprising the step of:

installing the cam into the second chamber of the connector body.

22. The method of claim 17, further comprising:

retaining the second portion of the mechanical splice assembly body and the first and second splice parts in the second chamber on the connector body.

\* \* \* \* \*